(12) United States Patent
Hayashi

(10) Patent No.: US 6,215,267 B1
(45) Date of Patent: Apr. 10, 2001

(54) NUMERIC CONTROLLER OF ROTATING MECHANISM

(75) Inventor: Tomoo Hayashi, Gotemba (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/425,024

(22) Filed: Oct. 25, 1999

(30) Foreign Application Priority Data

Oct. 27, 1998 (JP) .................................................. 10-305303

(51) Int. Cl.[7] ........................... G05B 19/18; G05B 19/41; G05B 19/25
(52) U.S. Cl. ........................... 318/570; 318/571; 318/572
(58) Field of Search .................................. 318/560–696; 409/12, 25, 51, 26, 71, 74, 232; 364/474.01–474.36

(56) References Cited

U.S. PATENT DOCUMENTS

| | | | | |
|---|---|---|---|---|
| 3,875,382 | * | 4/1975 | Cutler | 235/151.11 |
| 4,109,185 | * | 8/1978 | Froyd et al. | 318/571 |
| 4,255,643 | * | 3/1981 | Balfanz | 219/124.34 |
| 4,934,040 | * | 6/1990 | Turchan | 29/566 |
| 5,710,498 | * | 1/1998 | Yutkowitz et al. | 318/632 |

FOREIGN PATENT DOCUMENTS 10-43976  2/1998  (JP) .

\* cited by examiner

*Primary Examiner*—Paul Ip
(74) *Attorney, Agent, or Firm*—Pillsbury Winthrop LLP

(57) ABSTRACT

Numeric controller (3) for controlling a rotating mechanism (1) having a rotor rotated by a linearly moving driving source has a rotating position command means (311) for transmitting angular position commanding value (θ), a radius setting means (312) for setting rotation radius (R) of the rotor, and a linear position operation means (313) for operating linear position command value (L) of the driving source based on the angular position command value (θ) and the rotation radius (R). Since the linear position operation means (313) is provided, the linear position command value (L) can be calculated to drive the driving source only by commanding angular position command value (θ), thereby facilitating to construct programs inputted to the numeric controller.

7 Claims, 4 Drawing Sheets

US 6,215,267 B1

NUMERIC CONTROLLER OF ROTATING MECHANISM

BACKGROUND OF THE INVENTION

1. Field of the Invention

The present invention relates to a numeric controller of a rotating mechanism for rotating a rotor around a predetermined rotation axis by a driving source linearly moving along a predetermined linear axis through a nonlinear transmission mechanism.

2. Description of Related Art

Conventionally, a rotating mechanism having a driving source for linear movement and a transmission mechanism for transmitting the linear movement of the driving source to a rotor is known for a machine tool having rotating mechanism for rotating a rotor around a predetermined rotation axis. A rack and pinion mechanism, worm gear mechanism etc. are used as the transmission mechanism.

Some of the rotating mechanism uses a cam mechanism for driving the rotor, which is, for example, shown in a rotating mechanism of Japanese Patent Publication Laid-open No. Hei 10-43976 (Japanese Patent Application No. Hei 8-198035).

FIG. 4(A) shows a conventional rotating mechanism.

A rotating mechanism 1 has rotors 12 rotatably supported by a base member 11, a driving source 13 for rotating the rotors 12, and a transmission mechanism 14 for transmitting a movement of the driving source 13 to the rotors 12.

The rotors 12 are rotatably supported by the supporting shaft 15 around a rotation axis A, and a recessed portion 121 for engaging later-described connecting shaft 143 is formed at an end thereof.

A built-in motor type spindle head 122 is provided adjacent to the rotation axis A of the rotor 12, the spindle head 122 rotating in accordance with the rotating movement of the rotor 12 for conducting various processing to a workpiece.

The driving source 13 has a servo motor 131, a pinion gear 132 for engaging a gear provided at a distal end of a rotation axis of the servo motor 131, a feed screw rod 133 being rotated by the pinion gear 132 in accordance with rotation of the rotation axis of the servo motor 131, and a feed nut 134 for engaging the feed screw rod 133 to move linearly along an extending direction of the feed screw rod 133.

The transmission mechanism 14 for transmitting the linear movement of the feed nut 134 of the driving source 13 to the rotor 12 includes a horizontal slider 141, a vertical slider 142 and a connecting shaft 143.

The horizontal slider 141 is movable along an extending direction of a horizontal guide 111 linearly provided onto the base member 11. A vertical guide 141A extending perpendicular to extending direction of the horizontal guide 111 is provided on an upper surface of the horizontal slider 141.

The vertical slider 142 is movable along the extending direction of the vertical guide 141A, and the connecting shaft 143 for engaging to the recessed portion 121 of the rotor 12 is provided on an upper surface thereof.

The feed nut 134 of the driving source 13 is attached and fixed to the right horizontal slider 141.

Incidentally, the horizontal sliders 141 respectively provided to the two rotors 12 are mutually connected by a connecting rod 144 so that one of the rotors 12 is rotated in accordance with the rotation of the rotor on the right side in FIG. 4(A).

The rotating mechanism 1 is operated as follows.

(1) The feed screw rod 133 is rotated by the pinion gear 132 when the servomotor 131 is driven.

(2) The feed nut 134 is moved along the extending direction of the feed screw rod 133 by the rotation of the feed screw rod 133.

(3) The horizontal slider 141 is moved simultaneously with the movement of the feed nut 134 and the rotor 12 is rotated through the connecting shaft 143.

Incidentally, the connecting shaft 143 maintains engagement with the recessed portion 121 of the rotor 12 by moving along the vertical guide 141A together with the vertical slider 142 during movement of the horizontal slider 141.

And, as shown in FIG. 4(B), a locus 12A of the rotor 12 is arc-shaped around the rotation axis A in θ direction relative to a locus 134A of the feed nut 134 in L direction.

According to the rotating mechanism 1, the linear movement of the driving source 13 can be transmitted to the rotation of the rotor 12 by a simple movement of the horizontal slider 141 and the vertical slider 142 along the guide 111 and 144A.

Therefore, no wear of meshed portion, which causes failure of rotation movement as in the rack and pinion mechanism and worm gear mechanism, can occur, thereby obtaining highly durable rotating mechanism.

Further, when a plurality of rotor 12 is disposed adjacently in the transmission mechanism such as the rack and pinion mechanism, disposition space has to be set large for the gears of the adjacent transmission mechanism not to interfere with each other. In contrast thereto, since the rotor 12 can be closely disposed adjacently according to the above-mentioned rotating mechanism 1, a size of a machine tool having a plurality of rotor can be reduced.

For controlling drive of the rotating mechanism 1 by a numeric controller, the actually controlled driving source 13 moves linearly. Accordingly, a linear position L of the driving source 13 is calculated based on angular position θ of the target rotor 12 and the linear position L is transmitted to the numeric controller as a command value.

However, what is ultimately necessary for a process to give command to the numeric controller is angular position of the rotor 12 of the rotating mechanism. Therefore, the angular position θ of the rotor 12 is conveniently given to the numeric controller for constructing a software program, which reduces burden on programmers.

SUMMARY OF THE INVENTION

An object of the present invention is to provide a numeric controller of a rotating mechanism having a rotor rotated around a predetermined rotation axis through a non-linear transmission mechanism by a driving source for linearly moving around a predetermined linear axis which can facilitate to construct programs for transmitting commands to the numeric controller and reduce burdens on programmers.

The present invention is a numeric controller of a rotating mechanism for rotating a rotor around a predetermined rotation axis by a driving source for linearly moving along a predetermined linear axis through a non-linear transmission mechanism. The numeric controller is characterized in having a rotating position command means for transmitting angular position command value of the rotor; a radius setting means for setting a rotation radius of the rotor; and a linear position operation means for calculating a linear position command value of the driving source based on the angular position command value of the rotating position command means and the rotation radius set by the radius setting means.

According to the above arrangement, since the linear position operation means is provided, the rotating mechanism can be controlled by setting the angular position of the rotor as a command value by the rotating position command means when the rotation radius of the rotor of the rotating mechanism is set in advance by the radius setting means, thereby facilitating to construct program for transmitting commands to the numeric controller and reducing burden on programmers.

In the above arrangement, the linear position command value L (mm) can be calculated by the linear position operation means according to following formulas, where θ (deg) represents the angular position command value commanded by the rotating position command means; and R (mm) represents rotation radius being set by the radius setting means:

(1) $L = R \times \tan(\pi \times \theta/180)$ (2) $L = R \times \sin(\pi \times \theta/180)$ According to calculation of the above formulas, the angular position command value of the rotation axis represented by angle θ (deg) can easily be converted into linear position command value L (mm) of metric unit, thereby easily conducting drive control of the servo motor. Further, since the formula is simple, the burden required for arithmetic processing in the numeric controller can be made small.

DETAILED DESCRIPTION OF PREFERRED EMBODIMENT(S)

An embodiment of the present invention will be described below with reference to attached drawings. Incidentally, description for components identical or similar to the above-described members will be omitted or simplified.

Figure 1:
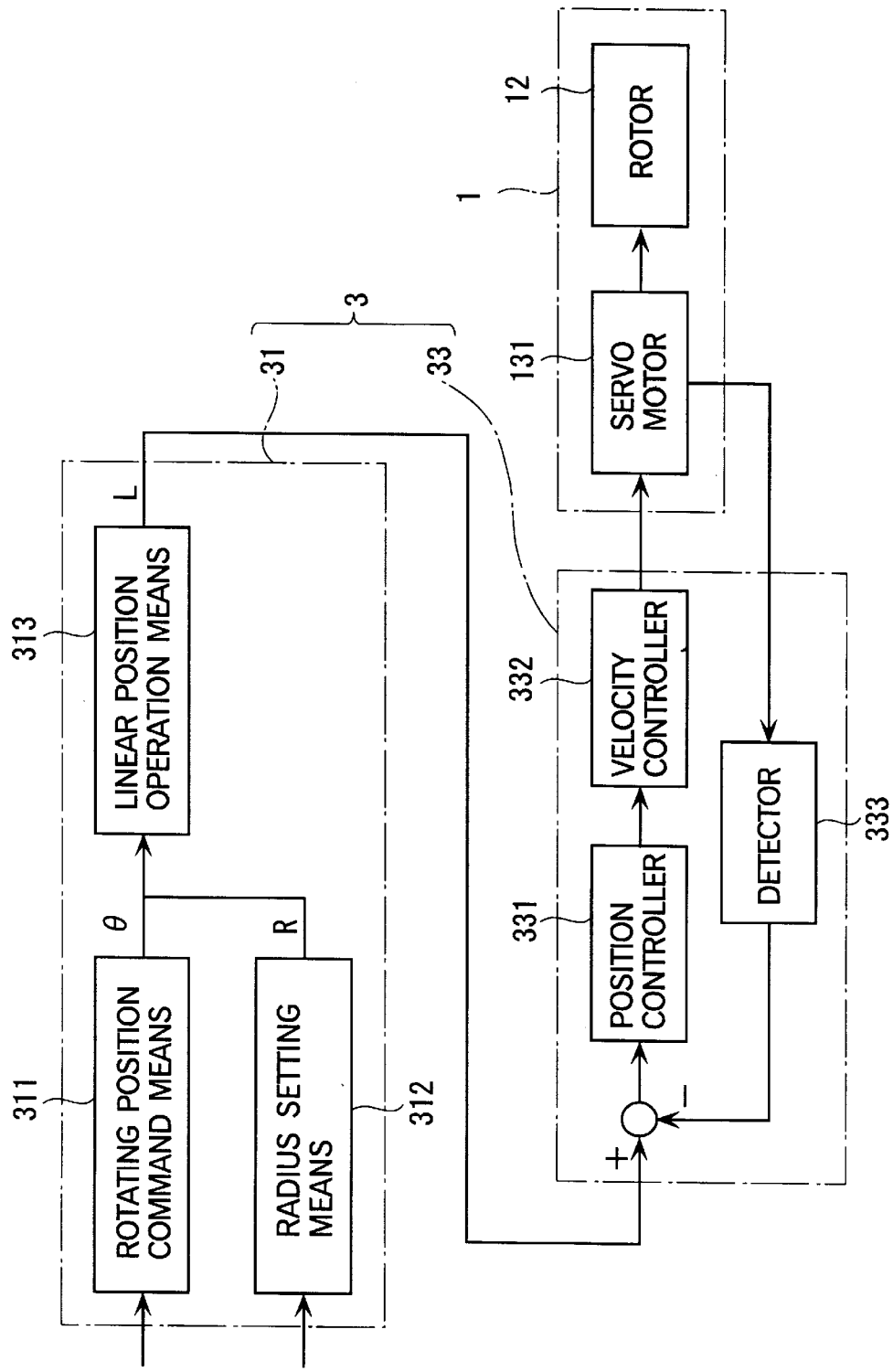
FIG. 1 is a block diagram showing structure of a numeric controller and a rotating mechanism according to an embodiment of the present invention.

FIG. 1 shows a rotating mechanism 1 and a numeric controller 3 for controlling the rotating mechanism 1 according to the present embodiment of the present invention. The rotating mechanism 1 has the same structure as described in the background art.

The numeric controller 3 has a command value generator 31 for analyzing inputted APT (Automatically Programmed Tool) program to generate position command value, speed command value and the like to the servomotor 131 of the rotating mechanism 1, and a servo controller 33 for controlling operation of the servo motor 131.

The command value generator 31 has a rotating position command means 311, a radius setting means 312 and a linear position operation means 313. The respective means are stored in a memory of the numeric controller 3 and are configured as a program called onto a CPU simultaneously with starting the numeric controller 3.

The rotating position command means 311 is a means for analyzing and interpolating operation command of the rotating mechanism 1 contained in the APT program to output position command of the rotation axis of the rotating mechanism 1 periodically. For example, when the inputted APT program has an operation command for rotating the rotor 12 of the rotating mechanism 1 by θp (deg: degrees) at an angular velocity of ωp (rad/s: radian per second), the rotating position command means 311 interpolates the locus of the rotor 12, and generates and outputs an angular position command value θ for each predetermined pulse distribution frequency.

Figure 4A:
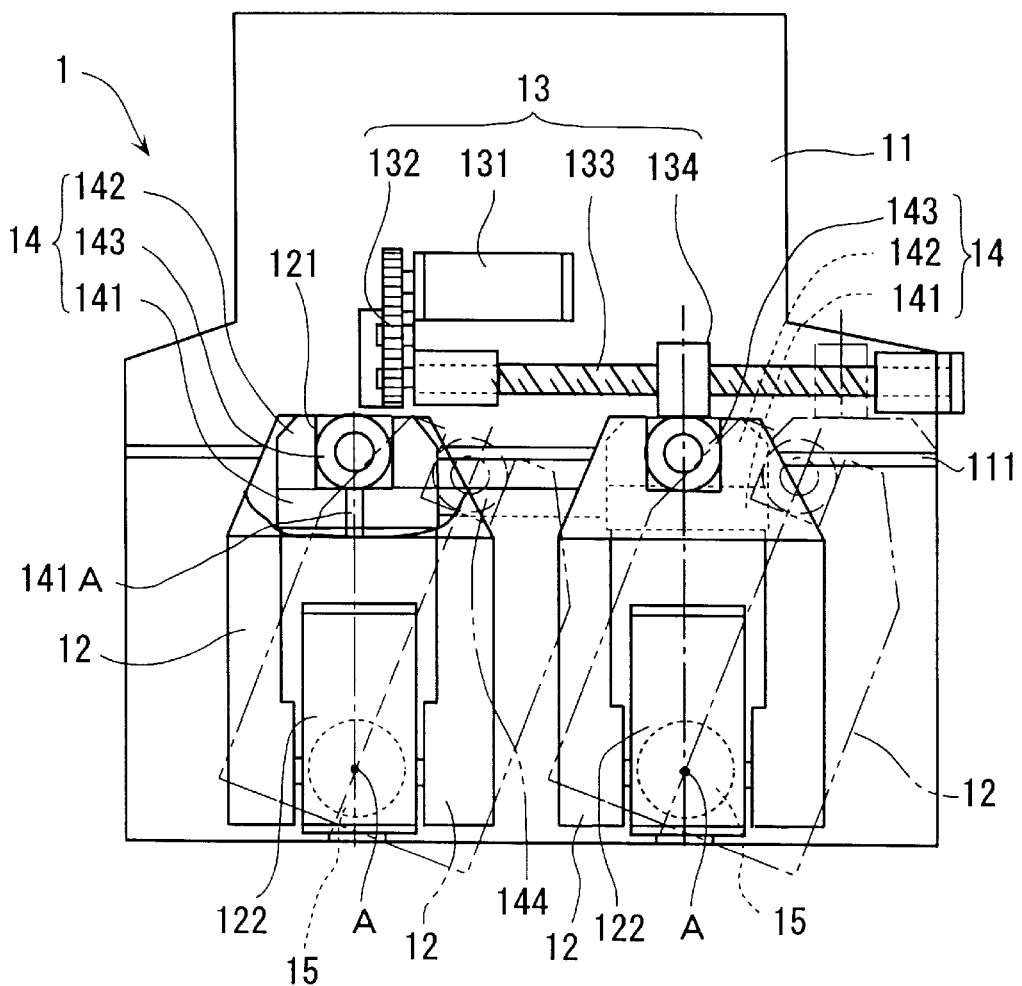
FIGS. 4(A) and 4(B) are top plan views showing a structure of a rotating mechanism according to conventional art.
Figure 4B:
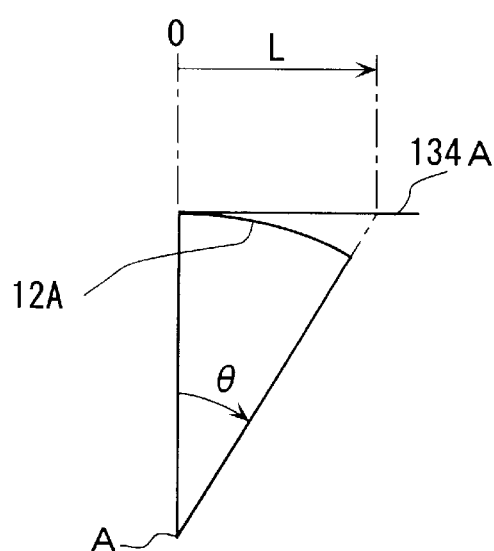

The radius setting means 312 is for setting a rotation radius R (mm) of the rotor 12 in FIG. 4(A). When the rotation radius R is set by the rotation radius setting means 312, the value is stored in the memory of the numeric controller 3. The numeric controller 3 automatically refers to the stored rotation radius R at start-up of the numeric controller 3 in the absence of resetting.

Figure 2:
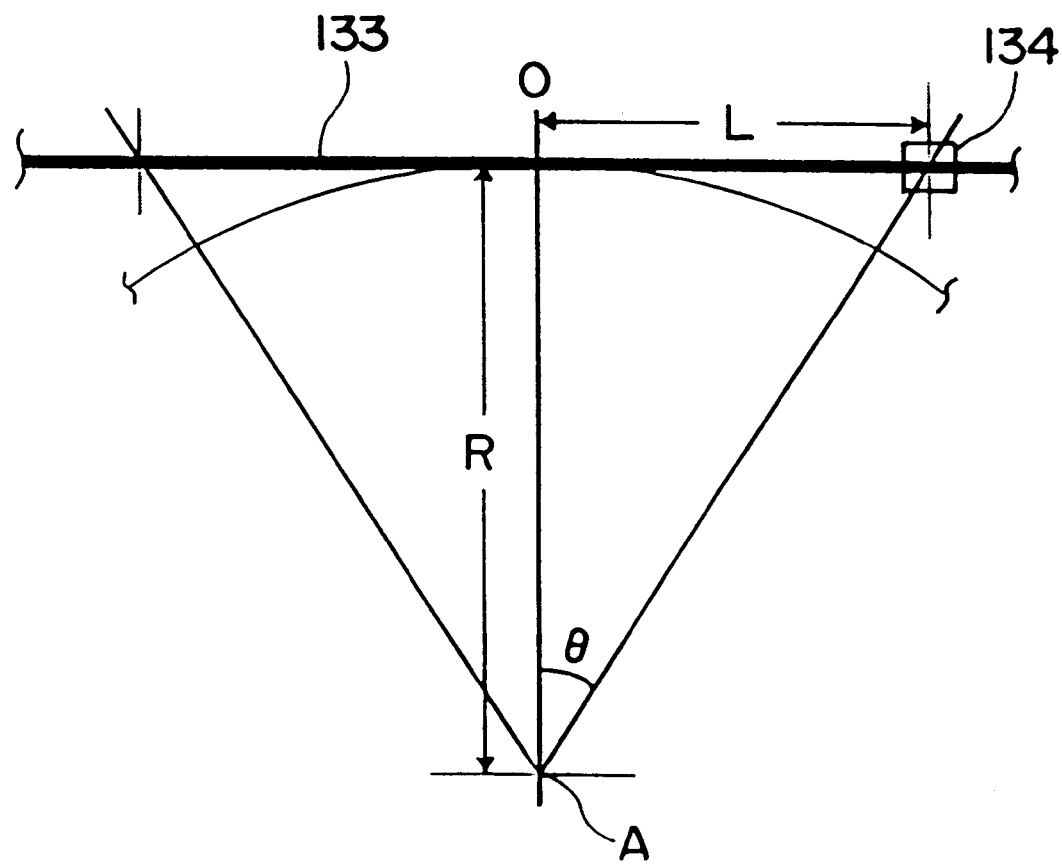
FIG. 2 is a schematic view showing calculating method of a linear position from an angular position command value in the aforesaid embodiment.

The linear position operation means 313 calculates and outputs the linear position command value L (mm) of the feed nut 134 of the driving source 13 in FIG. 4(A) based on the angular position command value θ outputted by the rotating position command means 311 and the rotation radius R being set by the radius setting means 312. More specifically, as shown in FIG. 2, when the rotor 12 is rotated by an angle θ around the rotation axis A, the linear position command value L of the feed nut 134 is given as a tangent of the angle θ at the radius R. In other words, the linear position operation means 313 calculates and outputs the linear position command value L as $L = R \times \tan(\pi \times \theta/180)$, based on the angular position command value θ and the rotation radius R.

The servo controller 33 conducts actual operation control of the servo motor 131, which includes a position controller 331 and velocity controller 332 for controlling position and velocity of the servo motor 131 based on the linear position command value L outputted by the linear position operation means 313, and a detector 333 for detecting an actual operating condition of the servo motor 131 to output feedback signal.

Incidentally, the control signal outputted by the position controller 331 and the velocity controller 332 is generated and outputted based on gear number of the pinion gear 132 in FIG. 4(A) and feed screw pitch of the feed screw rod 133 as well as characteristics of the servo motor 131. And, as shown in FIG. 1, the feedback signal of the detector 333 is added to the linear position command value L to be inputted to the position controller 331 and the speed controller 332.

Next, the operation of the numeric controller 3 and the rotating mechanism 1 will be described below.

(1) When the APT program is inputted to the numeric controller 3, the rotating position command means 311 analyzes operation command of the rotating mechanism 1 contained in the APT program, for instance, angular position command θp and angular velocity command ωp, to calculate periodic angular position command value θ to output to the linear position operation means 313.

(2) The linear position operation means 313 calculates the linear position command value L based on the inputted angular position command value θ and the rotation radius R set in advance by the radius setting means 312 to output to the servo controller 33.

(3) The servo controller 33 outputs position control command and velocity control command to the servo motor 131 to give linear position L to the feed nut 134 in FIG. 4(A).

(4) The position control command and the velocity control command operates the servo motor 131 and, simultaneously, the feed screw rod 134 rotates through the pinion gear to move the feed nut 134 linearly. The linear movement of the feed nut 134 is converted into rotation of the rotor 12 by the transmitting mechanism 14 in FIG. 4(A).

Following effects can be obtained in the aforesaid embodiment.

Since the linear position operation means 313 is provided, when the rotation radius R of the rotor 12 of the rotating mechanism 1 is set in advance by the radius setting means 312, the rotating mechanism 1 can be controlled only by setting the angular position θ of the rotor 12 as a command value by the rotating position command means 311, thereby facilitating to construct program for transmitting commands to the numeric controller 3.

Further, since the linear position operation means 313 calculates the linear position command value L by the formula of L=R×tan(π×θ/180), the angular position command value θ can be easily converted into the linear position command value L of metric unit, thereby easily conducting operation control of the servo motor 31. Further, since the formula is so simple, the burden applied to the CPU in the numeric controller for arithmetic processing can be decreased, thereby immediately conducting operation control of the rotating mechanism 1 by the numeric controller 3.

Incidentally, the scope of the present invention is not limited to the aforesaid embodiment, but includes following modifications.

Figure 3:
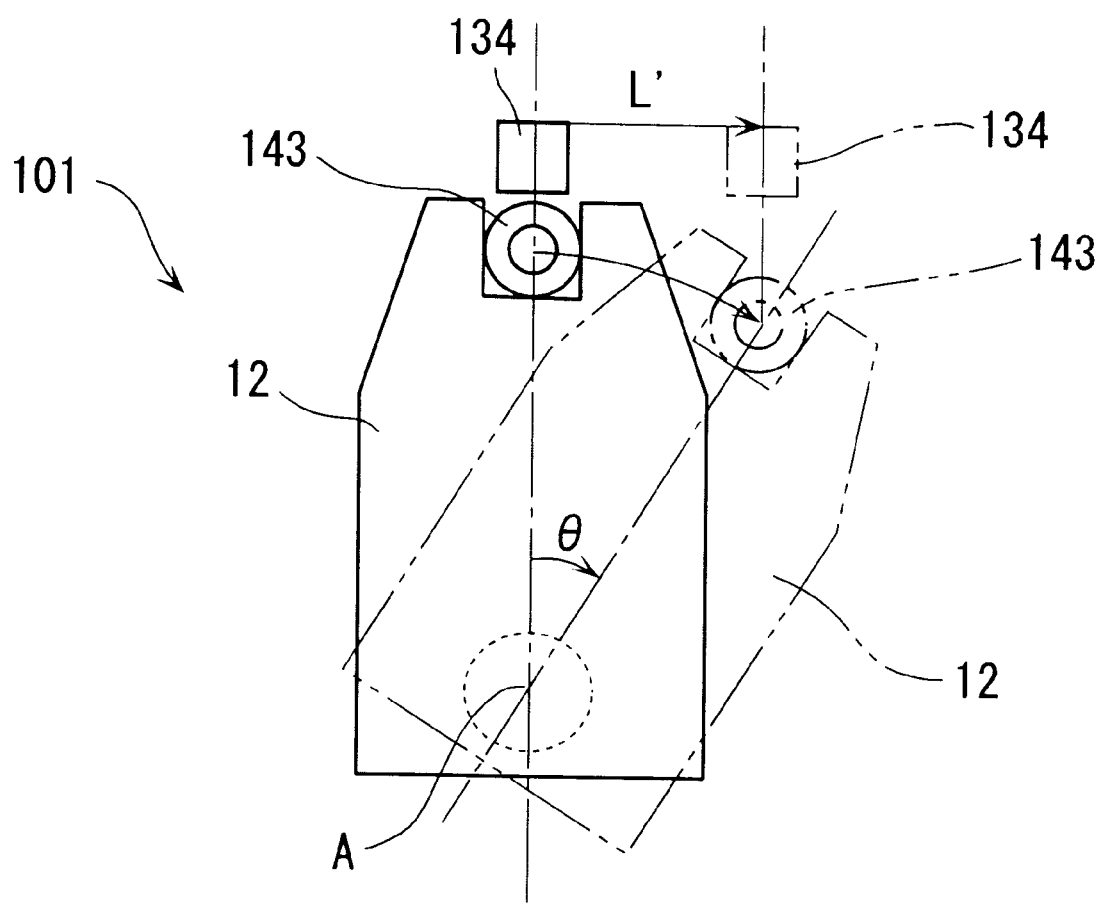
FIG. 3 is a schematic view showing arrangement of a rotating mechanism according to modification of the aforesaid embodiment.

Though the linear position command value L is calculated by taking tangent of the angular position command value θ in the linear position operation means 313, other arrangements are possible. As shown in FIG. 3, the linear position command value L' can be calculated by taking sine of angle command value θ when the rotor 12 is rotated so that L' directional position of rotating mechanism 101 corresponds to directional position L' of the feed nut 134. In this case, the linear position command value L' can be calculated by the linear position operation means based on the formula of L'=R×sin(π×θ/180).

Incidentally, since the connecting shaft 143 is separated from the feed nut 134 in accordance with the magnitude of the angle command value θ, sliding amount of the vertical slider 142 has to be set large.

Further, though the rotating position command means 311 and the linear position operation means 313 deal with the angular position command value by θ (deg: degrees) in the above-described embodiment, the angular position command value may be dealt with θ' (rad: radian). In this case, the linear position command value L is obtained by either one of the formulas of L=R×tanθ and L=R×sinθ'.

Other arrangements are possible for specific construction and configuration for implementing the present invention as long as the object of the present invention can be attained.

What is claimed is:

1. A numeric controller of a rotating mechanism for rotating a rotor around a predetermined rotation axis by a driving source for linearly moving along a predetermined linear axis through a non-linear transmission mechanism, comprising:

a rotating position command means for transmitting angular position command value of the rotor;

a radius setting means for setting a rotation radius of the rotor; and a linear position operation means for calculating a linear position command value of the driving source based on the angular position command value of the rotating position command means and the rotation radius set by the radius setting means.

2. The numeric controller of a rotating mechanism according to claim 1, wherein the linear position operation means calculates the linear position command value L (mm) according to formula of L=R×tan(π×θ/180), θ (deg) being the angular position command value commanded by the rotating position command means; and R (mm) being rotation radius being set by the radius setting means.

3. The numeric controller of a rotating mechanism according to claim 1, wherein the linear position operation means calculates the linear position command value L (mm) according to formula of L=R×sin(π×θ/180), θ (deg) being the angular position command value commanded by the rotating position command means; and R (mm) being rotation radius being set by the radius setting means.

4. The numeric controller of a rotating mechanism according to claim 1, further comprising: a command value generator including the rotating position command means, the radius setting means and the linear position operation means; and a servo controller for controlling movement of the driving source.

5. The numeric controller of a rotating mechanism according to claim 1, wherein the rotating position command means, the radius setting means and the linear position operation means are ordinarily stored in a memory of the numeric controller and are configured as a program called onto a CPU simultaneously with starting the numeric controller.

6. The numeric controller of a rotating mechanism according to claim 1, the driving source comprising a servo motor and a feed screw shaft.

7. The numeric controller of a rotating mechanism according to claim 1, wherein the rotor is driven by the driving source through a cam transmission mechanism.

\* \* \* \* \*